United States Patent [19]

Garza

[11] 4,357,158
[45] Nov. 2, 1982

[54] GOB DISTRIBUTOR FOR THE SHAPING OF ARTICLES OF GLASS AND OTHER MATERIALS

[75] Inventor: Elio M. Garza, Monterrey, Mexico

[73] Assignee: Investigacion FIC Fideicomiso, Monterrey, Mexico

[21] Appl. No.: 297,522

[22] Filed: Aug. 28, 1981

[30] Foreign Application Priority Data

Aug. 30, 1980 [MX] Mexico .................................. 184561

[51] Int. Cl.$^3$ .............................................. C03B 5/32
[52] U.S. Cl. ...................................... 65/225; 65/207; 65/304
[58] Field of Search .................. 65/207, 222, 225, 304

[56] References Cited

U.S. PATENT DOCUMENTS

| | | | |
|---|---|---|---|
| 3,142,553 | 7/1964 | Cook ..................................... | 65/304 |
| 3,147,102 | 9/1964 | Trudeau ................................ | 65/225 |
| 3,333,938 | 8/1967 | Zappia ................................... | 65/225 |
| 3,552,942 | 1/1971 | Trudeau ................................ | 65/304 |
| 3,592,624 | 7/1971 | Dahms ................................... | 65/304 |
| 3,597,187 | 8/1971 | Trudeau ................................ | 65/304 |
| 3,721,544 | 3/1973 | Bystrianyk et al. ................... | 65/207 |
| 3,775,083 | 11/1973 | Nebelung et al. ...................... | 65/25 |
| 3,871,858 | 3/1975 | Martin .................................... | 65/304 |

*Primary Examiner*—Robert L. Lindsay, Jr.
*Attorney, Agent, or Firm*—Abelman, Frayne & Rezac

[57] ABSTRACT

A gob distributor for machines for the shaping of articles of glass and other materials, which comprises basically a curved distributor scoop for each of the gobs which are supplied simultaneously by the doser, each of which scoops has its upper end aligned at all times with each respective orifice of the doser and is moved angularly in such a manner that its lower end coincides, in a predetermined order, with the upper ends of the fixed channels of the machine which conduct the gobs to the respective cavities of the individual sections of the machine; fastening means integrated in the upper end of each curved distributor scoop; a housing or support frame; a drive member and an auxiliary member which are linked movably to each other, which comprise fastening means on their inner part and which by their fastening means rotatably support the curved distributor scoops between them in a dependent linear relationship; linking means coupled to the drive and auxiliary members which oscillate on central pivots fastened to the housing or support frame in such a manner that by movements of advance and retraction of the drive member which are transmitted inversely to the auxiliary member by the linking means the distributor scoops are caused to turn angularly to predetermined delivery positions; a connecting rod articulately coupled at one of its ends to the drive member; and a positioner coupled to the other end of the connecting rod to impart the regulated movements of advance and retraction to the connecting rod and to the drive member so as to turn the curved scoops through an angle to the predetermined delivery position in a programmed sequence with precise movements between the different sections of the machine.

10 Claims, 5 Drawing Figures

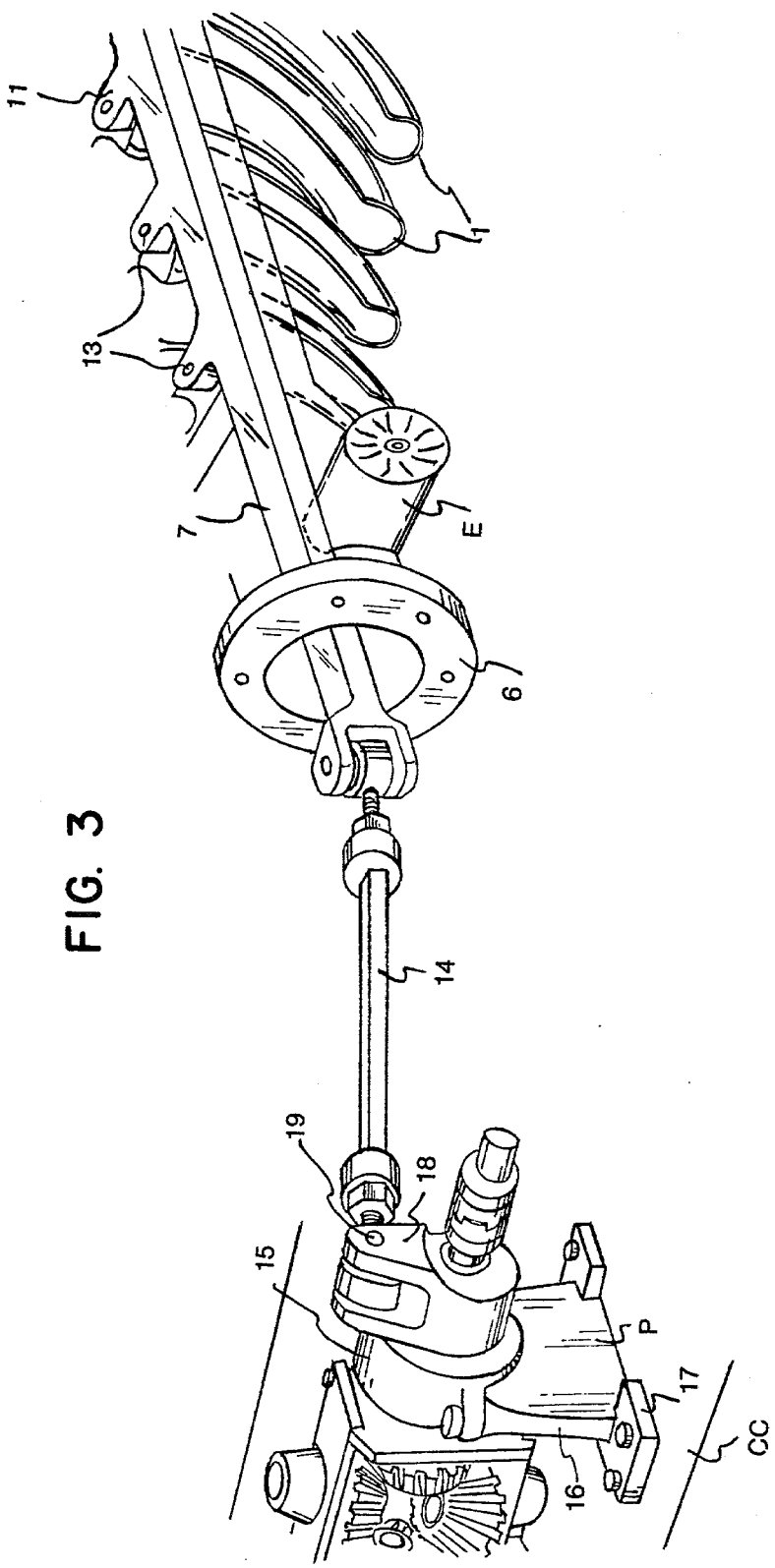

GOB DISTRIBUTOR FOR THE SHAPING OF ARTICLES OF GLASS AND OTHER MATERIALS

FIELD OF THE INVENTION

The present invention refers to a distributor of molten gobs of glass for machines for the shaping of articles of glass or other materials having a plurality of cavities and sections for effectively, efficiently and selectively distributing two or more gobs of molten glass in programmed sections, with precise movements, to the cavities of the different individual sections of the machine.

This gob distributor is of very simple construction and operation and of small size and a small number of parts, it being possible with it to operate at higher speeds of production and with better efficiency and effectiveness for the production of more articles of better quality.

BACKGROUND OF THE INVENTION

In the manufacture of articles of glass or other materials it is necessary to dose portions of molten glass for the formation of the articles.

These portions of molten glass are obtained from a source of molten glass which has a doser which comprises one or more orifices, usually two or four, each of which simultaneously supplies a jet of molten glass which is cut by suitable knives into portions known as gobs.

These gobs are distributed by a gob distributor through stationary channels to the cavities of the individual molding sections (customarily eight) of the machine in order to produce articles of glass of the "I.S. Machine" type.

The gob distributors are apparatus formed of curved distributor scoops (the number of which depends on the number of orifices of the doser and/or the number of cavities and sections of the machine) which are moved simultaneously towards or into gob receiving positions and towards gob delivery positions which coincide with the positions of the upper ends of the respective fixed channels.

The fixed channels (the number of which depends on the number of orifices of the doser multiplied by the number of sections of the machine) are fastened on the machine and arranged in a semi-circular configuration in such a manner that their upper ends coincide towards a point close to the doser, in coincidence with the curved distributor scoops, and their lower ends terminate close to or at the entrance of the cavities of the respective sections of the machine.

Gob distributors are well-known in the art and have achieved a very efficient stage of development during the last few years, so that they are extremely efficient units which make it possible to shape articles of glass in machines having multiple cavities and sections, which has increased production capacity and quantity to a great extent.

The gob distributors most recently known in the art consist generally of one or more curved distributor scoops whose upper end is located at any time below the orifices of the doser and whose lower end turns angularly to selective gob entrance positions which coincide with the positions of the upper ends of the aforementioned fixed channels.

For example, U.S. Pat. No. 3,597,187 to Urban P. Thrudeau and its reissue, U.S. Pat. No. Re. 28,073 granted on Aug. 3, 1971, and July 9, 1974, respectively and assigned to Owens-Illinois, Inc., describes a gob distributor in which each of the curved distributor scoops is supported individually by a vertical shaft which has a pinion at its lower end meshing with a rack of sector shape supported on a vertical shaft which has a cam follower which is compelled to follow the path of a cam in order to move the rack and pinion assembly sequentially so as to turn the scoops into predetermined delivery positions. Said cam is caused to rotate continuously by a drive mechanism which consists of a transverse shaft coupled at one end to the cam and which at its other end has a gear which meshes with a worm which is turned by a motor synchronized with the operating controls of the machine, such as the well-known time drum.

Due to their design and arrangement, these gob distributors have become more and more complicated, even including additional scoops for machines with sections of multiple cavities, for instance four, resulting in problems with respect to distribution, space and maintenance.

In U.S. Pat. No. 3,721,544 to Wasyl Brytrianyk and Francis A. Sarkozy, granted on Mar. 20, 1973 and assigned to Emhart Corporation there is described a gob distributor which comprises essentially a pair of rotary curved distributor scoops; a mechanism for supporting said scoops in a dependent linear relationship in order to cause then to turn on each of their vertical shafts, which mechanism includes a ring spur gear coupled to the upper end of each scoop and a funnel portion on the gear; a horizontally extending slideable member supported in a box which supports the mechanism and which at one of its ends has a rack portion which meshes with the spur gears of the upper part of the scoops in order to turn them by reciprocatable movements thereof and at its opposite end a rotary cam follower having a plurality of lobes, each of which has a predetermined lift which produces a reciprocating movement which defines the positions at which the distributor scoops turn to their selective delivery positions.

Finally, U.S. Pat. No. 3,775,083 to Nevelung et al., granted on Nov. 27, 1973, and assigned to Emhart Corporation describes a gob distributor having an arrangement of scoops similar to that of the preceding patent, which varies as to the manner of controlling the movement of the mechanism for supporting the scoops, which is obtained by means of racks on both sides of the ring spur gears coupled to the upper part of the scoops, each of which racks is actuated in reciprocation by fluid-operated motors in order to turn said ring spur gears and thereby the scoops in accordance with a sequence determined by signals or pulses fed to the linear motors.

These last two types of distributors require a cooling system both for the bronze bushings in which the gears are mounted and for the funnel portion, as well as for the scoops.

These cooling systems consist of passages of spiral configuration surrounding the funnel portion of the scoops and between the bushings and the gears. The cooling fluid generally used is water. These two last-mentioned patents to Bystrianyk and Nevelung have an advantage to the present to Thrudeau with respect to the solution of the problem of the distribution or arrangement of more than two curved distributing scoops since in these two last-mentioned patents said scoops are arranged in a line, fastened by gear-holding bushings to a supporting and cooling frame or housing.

Now it has been found that if the gobs of glass have the least possible contact with the parts of the machine during their feed path to it, the speed of passage reached by these gobs will be higher and the heat equilibrium reached for them better, which is highly desirable since with a higher speed of feed it is possible to increase the production and/or quality of the products produced.

In this respect, although the drop distributor of the Thrudeau patents has the problem of distribution or arrangement of the distributor scoops, it has the advantage of reducing the contact of the gob with the parts of the machine over the Bystrianyk and Nevelung distributors since the last two require bronze bushings, ring spur gears and a funnel portion which considerably increase the length of contact and the contact of said gobs with said parts, which reduces the speed of feed and the heat equilibrium of the drops, which is highly undesirable.

Furthermore said parts (bushings, gears and funnel portion) suffer considerable wear which cannot be compensated for automatically and they must be cooled with water by complicated systems which make the manufacture, assembly and maintenance thereof difficult, resulting in a higher cost, which makes the production and product more expensive.

In the distributors of Bystrianyk and Nevelung it is furthermore necessary to use gob rejectors which are mechanisms which withdraw the distributing scoops or put in position extra channels in order to reject or conduct the gobs to a deposit of scrap (called "cullet") when it is not desired to feed gobs to the machine because of repair, cleaning or changing of molds.

By the gob distributor of the present invention all the distribution problems of the distributor scoops are solved, such as excessive wear of the parts of the distributor resulting in misadjustments which cannot be automatically compensated for, excessive contact of the gob with the parts of the distributor, the necessity of complicated and costly cooling systems, and the necessity of complicated rejector mechanisms due to the fact that the distributor scoops are connected directly in line to the drive and auxiliary arms and due to their "scissor-like" play, compensate for or automatically adjust the maladjustments in their articulated parts retaining their synchronism with the machine, and that they are easily cooled by air applied to the housing frame which supports them, without the necessity of bushings and gears which have to be cooled internally, whereby contact of the gob with said undesirable parts is avoided. (See page 11, lines 23-25 and page 12, lines 1-7 of Mexican text.)

As for the problems resulting from the use of cams as drive elements for effecting the sequence of movements which is required in the distribution scoops of the gob distributor, they are well-known and reside essentially in the fact that as the cam is used as a drive element, as is clearly described in the afore-mentioned U.S. patents to Trudeau and Bystrianyk et al., these cams suffer considerable wear by virtue of the fact that they are continuously exerting substantial forces in order to move the entire mechanism at high speed so that their cam surface is rapidly damaged and the distribution scoops start to become misadjusted in their movements, a moment being reached when it is necessary to stop the machine in order to replace the cam in question since the variation in position caused by the wear of the surface of the cam has the result that the distribution of the gobs of glass becomes inefficient within a short time. Furthermore, drive cam mechanisms like those previously indicated have the great disadvantage that it is necessary to provide frequent and careful maintenance of the stationary channels for the reception of gobs of glass corresponding to each of the molding selections since if the distributing scoops and/or the stationary channels become slightly out of line the distribution of the gobs of glass to the different sections of the machine also becomes inefficient in the case of such slight misalignment of the channels and scoops. Furthermore, these mechanisms which are operated by drive cam necessarily require a motor which operates in strict synchronism with the time drum of the glass article molding machine since if the motor slows down or goes faster there is no way of correcting it unless the machine is stopped and the indicated repairs are made.

Another important disadvantage of mechanical controls by drive cam for gob distributors resides in the fact that as said controls are based on a mechanical cam there is absolutely no possibility of modifying, if desired, the sequence of operation of the different sections of a machine for the molding of glass articles unless the cam is replaced by another entirely different one which contains said sequence, and this, of course, can only be done after stopping the machine in order to effect the replacement of the cam, a mechanical operation which in itself is complicated in view of the act that the cam is normally covered and it is necessary to remove a large number of parts in order to effect its replacement. Finally, with these drive cam mechanisms it is necessary, in the event that it is not desired that the gobs of glass pass to one or more sections of the machine which may be under repair or in which the molds are being changed or similar operations carried out, to operate a gob rejector entirely separately and by completely different controls which must be operated by entirely different fluid or mechanical signals, which constitutes another serious disadvantage of this type of drive cam mechanism.

Although the control mechanism of Nevelung et al., U.S. Pat. No. 3,775,083, completely eliminates the use of a drive cam to control the movement of the movable scoops of the distributor, it incorporates in its place a considerable complexity in the mechanism since it requires the provision and construction of a plurality of individual pistons, all located in tandem and some striking against others in a predetermined sequence in order to produce the staggered sequential movements of the distribution scoop so that this complexity in the mechanism results in continuous failures and has the result that said fluid controls is also highly ineffective, particularly for work at high speed.

In this particular case also an additional signal is required from the different molding stations of the glass article molding machine in order to insert the rejector in the event that one of said sections is under repair or the molds are being changed.

In this respect, co-pending Mexican Application No. 181,707 assigned to the same assignee as the present application, describes and claims an electronic gob distributor as well as a control system for same in which each of the distributing scoop is mounted on a shaft which is driven directly or indirectly by an individual pulse motor for each shaft or one pulse motor for all the shafts and an electronic control for the motors, by which is it possible to make the actuating shafts independent so as to control each one of the scoops in order to obtain optimum precision and flexibility, or the actuation of the channels jointly is permitted with high flexibility of adjustment, correction and sequence, and no mechanical or hydraulic means are employed to effect the control of movements, thus solving the problems of wear, synchronism and misadjustment inherent in the distributors of Thrudeau, Bystrianyk and Nevelung.

Now then, although the gob distributor of the present invention can use the same mechanical drive systems based on cams as its positioner to impart the movements of advance and retraction to the drive crank-holder arm for the actuation of the scoops it is also advisable to use the electronic drive system of the said Mexican Patent Application No. 181,707 as well as its electronic control systems as the positioner of the gob distributor of the present invention.

The manufacturers of stepping motors recommend, however, that they operate at higher speeds, above a resonance parameter at which synchronism could be lost, that is to say if the motors are operated at a given time at low speeds within the resonance parameter specified by the manufacturer, they may gain or lose pulses, each of which pulses is equivalent to approximately 0.001 inch, which, in cases such as the machining of a work part by a milling machine, is unimportant since said parts tolerate up to ±0.003 inch of error in their final machined measurements but in cases such as the gob distributor with which we are concerned is of great significance since the space present between the upper ends of the fixed channels, with which the dosing scoops coincide, is very small and critical and a gradual loss or gain of pulses will signify a lack of adjustment in the coincidence of the dosing scoops and the fixed channels and loss of synchronism with the rest of the machine.

In view of the foregoing, in cases in which one operates at high speeds and with critical precision, as in the case with which we are concerned, the manufacturers of these motors recommend that they not be stopped but that they be operated continuously and that only the high speeds be varied, that is to say that only gear transmissions be changed.

In order to avoid these problems of lack of synchronization of the pulse motors, the co-pending Mexican Patent Application No. 184,523 assigned to the same assignee as the present application, describes and claims a precision positioning system with desired programmed times in which use is made of two pulses motors which turn in opposite directions, connected to a rotating differential housing which rotates precisely and regularly due to changes in the speeds of its motors, which differential housing transmits its pulse to a positioner formed of a rack and pinion or a connection rod and fork, etc., thus eliminating the danger of operating the pulse motors at low speeds, within their resonance parameters, whenever both of its motors are operating jointly at high speeds and the only thing which varies is the speed of them within said range of high speeds which remain well above the resonance parameters which the manufacturers of pulse motors specify.

It is therefore highly advisable to use said precision positioning system with programmed desired times to actuate the gob distributor of the present invention.

From what has been stated above, it is obvious that the gob distributor of the present invention can be actuated with any type of positioner, whether mechanical or electronic, provided that the pulse or actuation is imparted to it in a synchronized and precise manner.

BRIEF SUMMARY OF THE INVENTION

Therefore, a main object of the present invention is to provide a gob distributor for machines which employs a drive arm and an auxiliary arm, which arms are pivotally inter-connected in order to turn the curved distributing scoops to their predetermined delivery positions.

Another object of the invention is to provide a gob distributor of the above-indicated type which can be used with any positioning system, whether of cam, crank and connecting rod, or mechanical type or precision positioners with predetermined desired times, whether electric or electronic, in order to establish the impulse necessary to bring the curved distributing scoops towards their predetermined delivery positions.

Still another object of the invention is to provide a gob distributor of the type described above which is easily lubricated and capable of being cooled by simple and economical cooling systems, such as fans or the like.

Still another object of the invention is to provide a gob distributor with which the contact of the gob with the parts of the distributor is optimally decreased.

A further object of the invention is to provide a gob distributor which eliminates the necessity of funnel portions, which does not require bronze bushings which have to be water-cooled, which automatically eliminates the play of its parts, which eliminates the necessity of complicated mechanisms having a basis of rack and pinion assemblies as elements for turning the scoops, which does not require any special cooling and lubricating systems, and which is of simple and economical configuration and operation and requires little or no maintenance.

These and other objects of the invention will be obvious to those skilled in the art from the following detailed description of the invention.

DESCRIPTION OF THE SPECIFIC EMBODIMENTS OF THE INVENTION

The invention will be described below with reference to specific embodiments thereof shown in the accompanying drawings in which the same reference numbers indicate the same parts in the figures and in which FIG. 1 is a molten glass gob distribution diagram showing the coincidence between the curved distributing scoops and the fixed channels of the machine for double-cavity machines;

FIG. 3 is a conventional perspective view in detail of a first embodiment of the positioner for the gob distributor shown in FIG. 2

Figure 1:
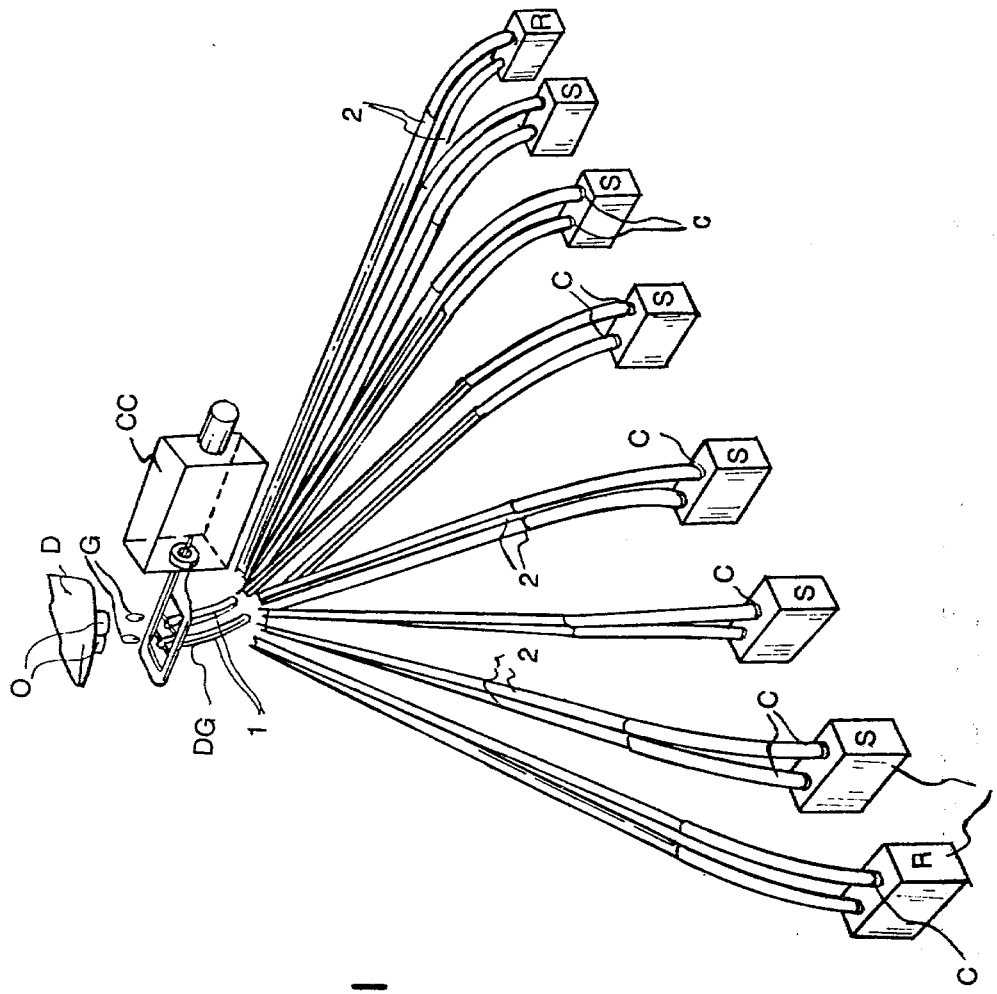

Referring to FIG. 1, in the process of producing and manufacturing articles of glass, the molten glass is fed from a doser D in the form of gobs G which are distributed by a gob distributor DG to the stationary channels 2 which conduct the gobs G to the cavities C of the individual sections S of a machine of the type known as an I.S. machine.

Figures 2, 2A:
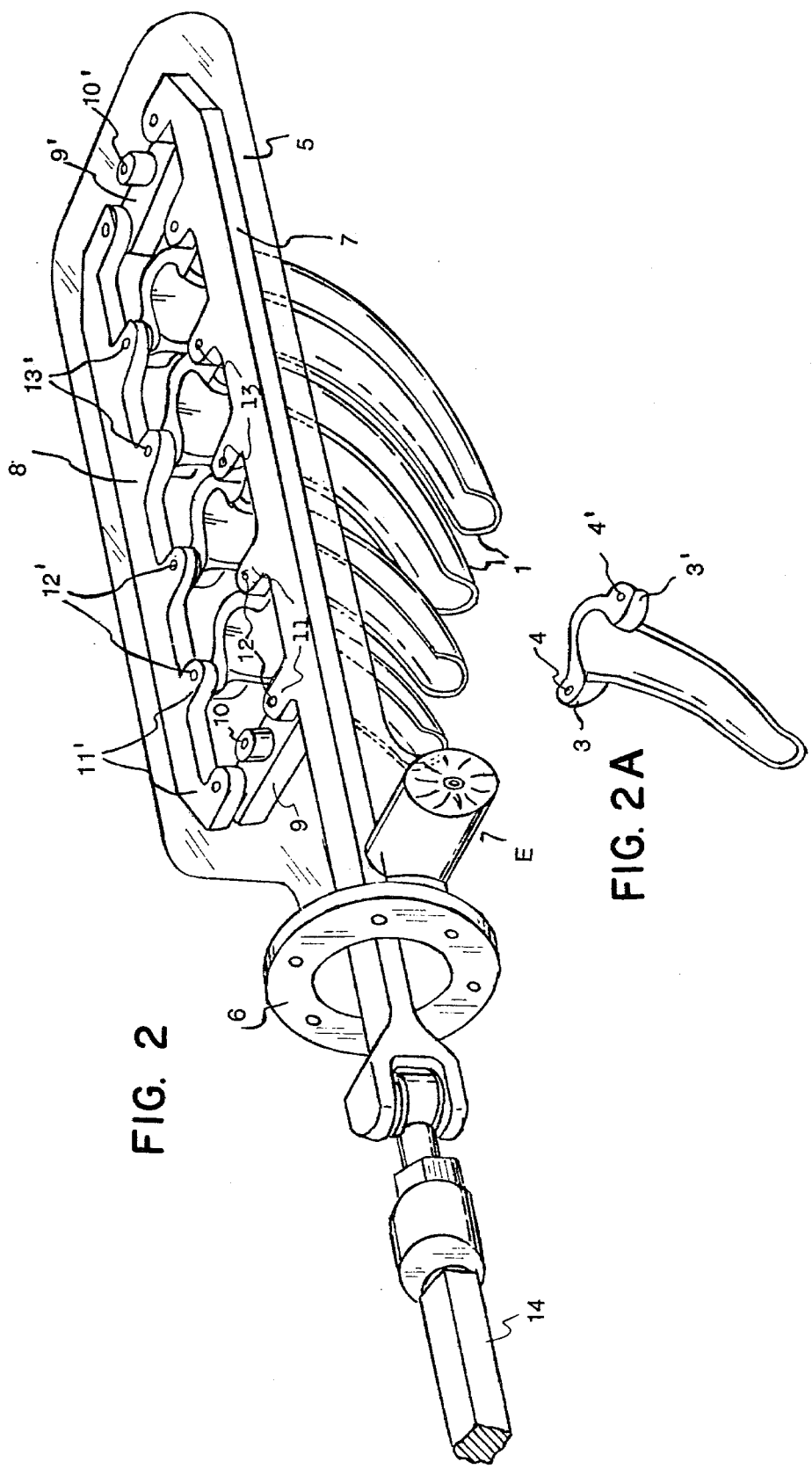
FIG. 2 and 2A are conventional perspective views of the gob distributor and of a part of a curved channel thereof in accordance with the present invention for machines with individual sections of four cavities.

The gob distributor DG of the present invention, shown in detail in FIGS. 2 and 2A, is formed essentially by:

A curved distributing scoop 1 for each of the gobs G which are supplied through each orifice O of the doser D, each of which scoops 1 has its upper end developed in funnel shape and comprises a lug 3 and 3' having a centered perforation 4 and 4' on each side thereof and is aligned respectively at all times with each orifice O of the distributor D and is moved angularly so that its lower end coincides in a predetermined order with the upper ends of the fixed channels 2 (FIG. 1) which lead the gobs to the cavities C of the individual sections S of the machine;

A support housing or frame 5 which has a connecting flange 6 which is fastened to the frame CC of a mechanical or electrical or electronic drive system (not shown).

A driving connecting-rod holding arm 7 and an auxiliary arm 8 which are connected together movably by support links 9, 9' at their ends, which oscillte on central pivots 10, 10' fastened to the housing or frame 5 which rod-holding arm 7 and auxiliary rod 8 comprise on their insides a plurality of small lugs 11, 11' respectively which have perforations 12, 12' respectively and turnably support between them, by their upper end and in linear relation, the rotary scoops 1 by means of pins 13, 13' which pass through the perforations 4, 4' of the scoops 1 and the perforations 12 and 12' of the rod-holder arm 7 and auxiliary arm 8 in such a manner that by movements of advance and retraction of the rod-holder arm 7, which are transmitted inversely to the auxiliary arm 8 by the pivoted links 9, 9', the distributing scoops are turned through an angle to predetermined delivery positions which coincide with the stationary channels 2 of the machine.

A connecting rod 14 which is pivotally connected at one of its ends to the rod-holder arm 7; and a positioner P (FIGS. 3 and 4) which is coupled to the end of the rod 14 in order to impart the regular movements of advance and retraction to the connecting rod 14 and to the rod-holder arm 7 in order to turn the curved scoops 1 through an angle to the predetermined delivery position in a programmed sequence and with precise movements between the different fixed channels 2 which conduct the gobs to the different sections S of the machine.

The positioner P may be of the fork type, as illustrated in FIG. 3, and comprises, in this first embodiment, one or two pillow blocks 15, 15' supported on posts 16, 16' anchored on support plates 17, 17' firmly attached to the frame CC; a fork 18 coupled to drive means (not shown) between the two pillow blocks 15,15', which fork 18 at its upper part pivotally secures via a shaft 19 the connecting rod 14 which is coupled to the rod-holding arm 7.

Figure 4:
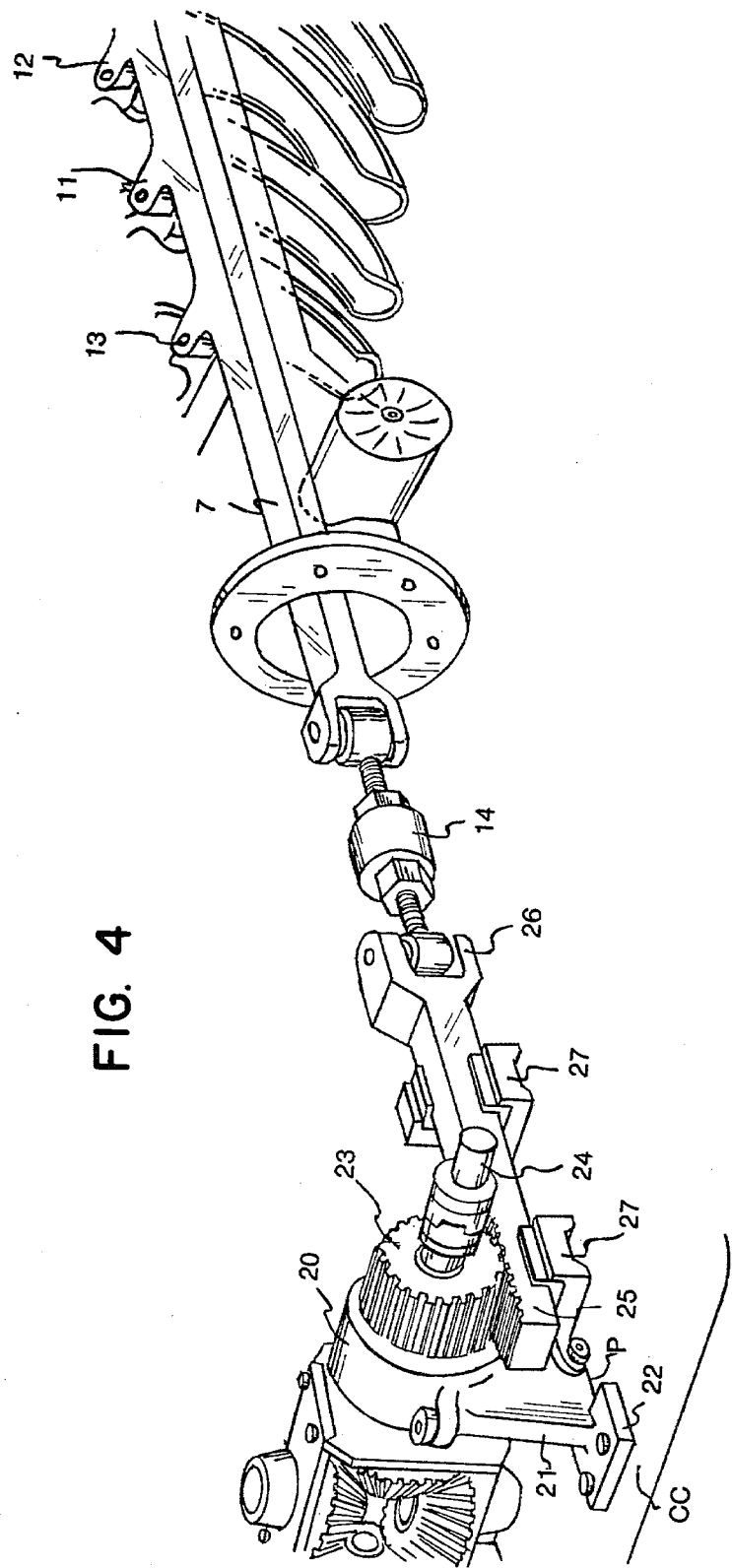
FIG. 4 is a conventional perspective view of a second embodiment of the positioner for the gob distributor illustrated in FIG. 2.

In a second embodiment, shown in FIG. 4, the positioner P may consist of the two pillow blocks 20, 20' supported by their respective posts 21, 21' anchored on the plates 22, 22' of the frame CC; a pinion 23 mounted on a shaft 24 which is connected to the drive means (not shown); and a rack 25 which has a rod-holder 26 which is pivotally connected to the connecting rod 14 which in its turn is pivotally coupled to the rod-holder arm 7; and an adjustable bearing 27 which adjustably secures or grips the rack 25 so that it at all times remains meshed with the pinion 23.

In this way the positioners P, whether of the fork type (FIG. 3) or the pinion or rack type (FIG. 4), impart the movement of advance and retraction to the rod-holder arm 7 whose movement is transitory in the direction opposite the auxiliary arm 8, causing the scoops 1 to turn to their predetermined delivery positions in coincidence with the fixed channels 2 of the machine.

Although two embodiments for the positioner P of the gob distributor DG of the present invention have been described above, it will be obvious to those skilled in the art that either type of positioner can be adapted to impart a movement of advance and retraction of the connecting rod 7 so as to obtain the rotary distribution movement of the curved scoops 1.

In the housing or frame 5 of the gob distributor DG there can be fitted a cooling fan E in order to cool all the parts of the distributor by means of forced air.

Furthermore in the said housing or frame 5 there must be included oil cups (not shown) in order to lubricate both the articulated portions and the scoops, if this is desired.

Therefore, it will be understood that those skilled in the art can make changes in the design or distribution or the parts of the gob distributor of the present invention, which, however, remain within the true scope and range of the invention which is claimed in the following claims.

I claim:

1. A gob distributor for machines for the shaping of articles of glass or other materials, comprising: a curved distributing scoop for each of the gobs which are supplied simultaneously by the distributor, each of which scoop has its upper end aligned at all times with each respective orifice of the doser and is moved angularly so that its lower end coincides, in a predetermined order, with the ends of the fixed channels of the machine which lead the gobs to the respective cavities of the individual sections of the machine; fastening means coupled to the upper end of each scoop; a support frame or housing; a drive member and an auxiliary member which are linked movably to each other and which comprise fastening means on their inner part and which by their fastening means rotatably support the curved distributor scoops, in dependent linear relationship; linking means pivotally connected to the drive and auxiliary members which oscillate on central pivots fastened to the housing or frame so that, by movements of advance and retraction of the drive member which are transmitted inversely to the auxiliary member by the linking means, the distriubting scoops are turned angularly to predetermined delivery positions; a connecting rod articulately coupled at one of its ends to the drive member; and a positioner coupled to the other end of the connecting rod in order to impart the regulated movements of advance and retraction to the connection rod and the drive member in order to turn the curved scoops through an angle to the predetermined delivery position in a programmed sequence and with precise movements between the different sections of the machine.

2. A gob distributor for machines for the shaping of articles of glass or other materials according to claim 1 in which the means for fastening the curved distributing scoops consist of a small lug on each side of each scoop and the means for fastening the drive and auxiliary members comprise a plurality of small lugs on its inner side, to which the small lugs of the curved distributing scoops are coupled.

3. A gob distributor for machines for the shaping of articles of glass or other materials according to claim 1, in which the linking means comprise a support link which oscillates on a central pivot fastened to the housing or frame on each end of the drive and auxiliary members linking them together.

4. A gob distributor for machines for the shaping of articles of glass or other materials according to claim 1 in which the drive member is a driving rod-holder arm and the auxiliary member is an auxiliary arm which articulately cooperates with the drive rod-holder arm.

5. A gob distributor for machines for the shaping of articles of glass or other materials according to claim 1 in which the housing or support frame comprises a lubricating and cooling system.

6. A gob distributor for machines for the shaping of articles of glass or other materials according to claim 1 in which the positioner is located in a frame to which the support housing or frame is coupled.

7. A gob distributor for machines for the shaping of articles of glass or other materials according to claim 1 in which the positioner is of the fork type which imparts the movements of advance and retraction to the connecting rod and to the drive member.

8. A gob distributor for machines for the shaping of articles of glass or other materials according to claim 1 in which the positioner is of the pinion and rack type, the pinion of which is articulately coupled to the connecting rod which is articulately fastened to the drive member.

9. A gob distributor for machines for the shaping of articles of glass or other materials in accordance with claim 1, in which the drive means are mechanical, electrical or electronic.

10. A gob distributor for machines for the shaping of articles of glass or other materials according to claim 1 in which the upper part of the curved distributor scoops have the shape of a funnel.

* * * * *